United States Patent [19]

McGill et al.

[11]  4,405,587

[45]  Sep. 20, 1983

[54] PROCESS FOR REDUCTION OF OXIDES OF NITROGEN

[75] Inventors: Eugene C. McGill, Skiatook; Ronald D. Bell, Tulsa, both of Okla.

[73] Assignee: McGill Incorporated, Tulsa, Okla.

[21] Appl. No.: 348,840

[22] Filed: Feb. 16, 1982

[51] Int. Cl.$^3$ .................. C01B 21/00; B01D 47/00
[52] U.S. Cl. ................................ 423/235; 423/210; 423/212; 431/4; 431/10
[58] Field of Search ............... 423/210 C, 212, 235; 431/4, 10

[56]  References Cited

U.S. PATENT DOCUMENTS

| | | | |
|---|---|---|---|
| 3,860,384 | 1/1975 | Vulliet et al. | 423/235 X |
| 3,873,671 | 3/1975 | Reed et al. | 423/235 |
| 3,911,083 | 10/1975 | Reed et al. | 423/235 |
| 4,144,313 | 3/1979 | Germerdonk | 423/210 C |
| 4,244,325 | 1/1981 | Hart et al. | 423/235 |

FOREIGN PATENT DOCUMENTS

| | | | |
|---|---|---|---|
| 54-50470 | 4/1979 | Japan | 423/235 |
| 54-38431 | 11/1979 | Japan | 423/235 |

Primary Examiner—Gregory A. Heller
Attorney, Agent, or Firm—Bill D. McCarthy

[57]  ABSTRACT

An improved process for reducing the concentration of oxides of nitrogen ($NO_x$) in a waste stream is provided wherein an effluent stream containing oxides of nitrogen ($NO_x$) is burned at a temperature greater than about 2000° F. and less than about 3000° F. with an effective amount of an oxygen containing gas and a stoichiometric excess of a hydrocarbon, based on the total amount of available oxygen, to provide a combustion effluent. The combustion effluent is thereafter contacted, at a temperature in the range of from about 1600° F. to about 1800° F., with an effective amount of a gaseous stream containing less than 21 volume percent oxygen to substantially oxidize all combustibles present in the combustion effluent and provide an oxidation effluent substantially free of oxides or nitrogen ($NO_x$) and combustibles. The oxidation effluent may be cooled in heat exchange equipment to recover energy, recycled to support the combustion and/or the oxidation of the combustibles, or vented to the atmosphere.

20 Claims, 2 Drawing Figures

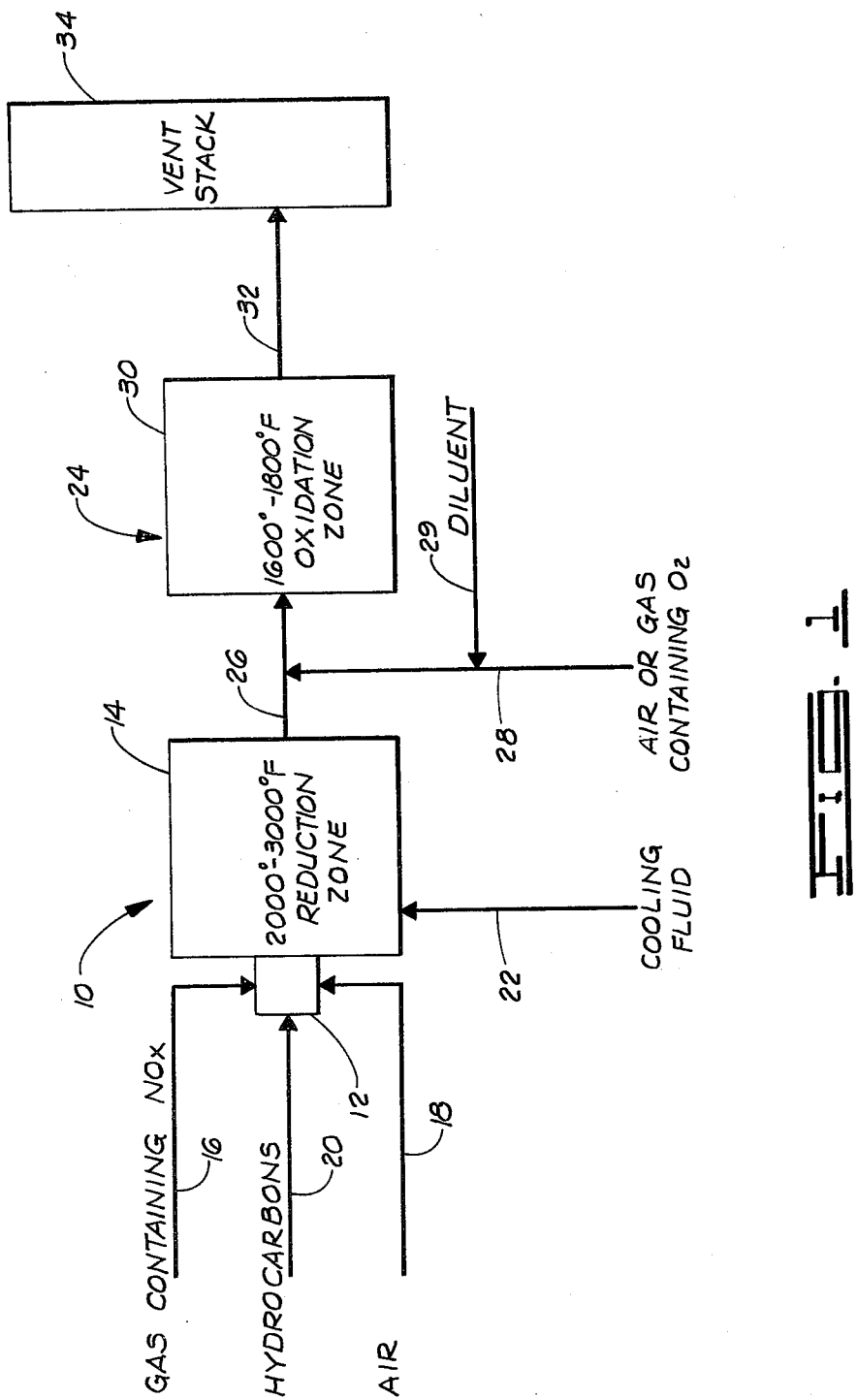

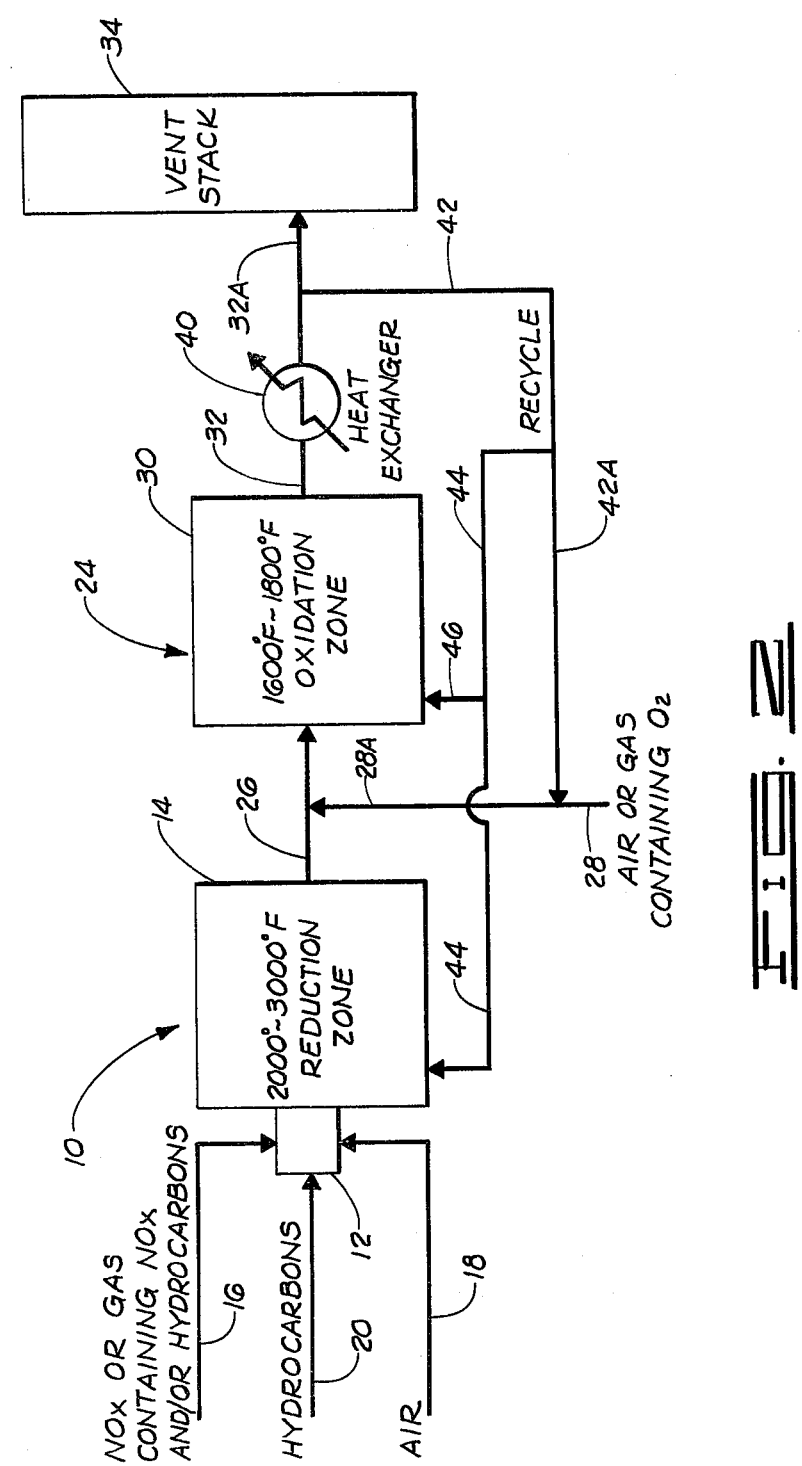

PROCESS FOR REDUCTION OF OXIDES OF NITROGEN

BACKGROUND OF THE INVENTION

1. Field of the Invention

The present invention relates to the removal of oxides of nitrogen ($NO_x$) from streams containing same, and more particularly but not by way of limitation, to an improved process for removing oxides of nitrogen ($NO_x$) from chemical waste streams.

2. Brief Statement of the Prior Art

Oxides of nitrogen are one of the principal contaminants emitted by combustion processes. In every combustion process, the high temperatures at the burner result in the fixation of some oxides of nitrogen. These compounds are found in stack gases mainly as nitric oxide (NO) with lesser amounts of nitrogen dioxide ($NO_2$) and only traces of other oxides. Since nitric oxide (NO) continues to oxidize to nitrogen dioxide ($NO_2$) in the air at ordinary temperatures, there is no way to predict with accuracy the amounts of each separately in vented gases at a given time. Thus, the total amount of nitric oxide (NO) plus nitrogen dioxide ($NO_2$) in a sample is determined and referred to as "oxides of nitrogen" ($NO_x$).

Oxides of nitrogen emmissions from stack gases, through atmospheric reactions, produce "smog" that stings eyes and causes acid rains. For these reasons, the content of oxides of nitrogen present in gases vented to the atmosphere is severely limited by various state and federal agencies.

There have been considerable efforts in the art to find ways to remove the oxides of nitrogen from waste gases so that the waste gases may be discharged to the atmosphere without harm to the environment. One such prior art method utilizes an adsorption medium to adsorb the oxides of nitrogen. However, this method of removing oxides of nitrogen results in the formation of either an acidic liquid or other nitrogen containing noxious liquid streams which must be treated further before they can be safely discharged into the environment.

Another prior art process for reducing the content of oxides of nitrogen ($NO_x$) in industrial waste gases employs the concept of reducing the oxides of nitrogen in the presence of an excess of a hydrocarbon at elevated temperatures. Such a process effectively reduces the amount of oxides of nitrogen present in the waste gases to a level that is satisfactory for release into the atmosphere. However, by-products, such as carbon monoxide, hydrogen, and carbon, are produced in such quantities that the release of the waste gases containing these by-products will cause harm to the environment unless additional steps are taken to treat the waste gases.

One process employed to reduce the amount of oxides of nitrogen ($NO_x$) in gaseous streams so that the gaseous streams can be vented into the surrounding atmosphere without contamination of the environment, including smoke or particulate matter, is disclosed in U.S. Pat. No. 3,873,671 issued Mar. 25, 1975 and entitled "Process for Disposal of Oxides of Nitrogen". This patent teaches the burning of a hydrocarbon fuel with less than a stiochiometric amount of oxygen, the oxygen being supplied by air, by the oxides of nitrogen ($NO_x$) present in the stream to be treated, or by a stream of air containing oxides of nitrogen. The combustion products of the hydrocarbon fuel are then mixed with gases containing oxides of nitrogen ($NO_x$) in a ratio which provides an excess of oxidizable material under conditions that will enable a portion of the combustible products to be oxidized by oxygen made available from the decomposition of the oxides of nitrogen ($NO_x$), thus reducing such oxides of nitrogen. This combined combustion mixture is thereafter cooled to a temperature in the range of about 2000° F. to about 1200° F. with a cooling fluid substantially free of oxygen. To prevent venting the excess combustibles into the atmosphere, the cooled mixture of nitrogen, combustion products and other oxidizable materials is thereafter mixed in a second zone with sufficient oxygen to convert substantially all of the oxidizable combustion products remaining to carbon dioxide and water without the reformation of oxides of nitrogen ($NO_x$).

The process set forth in the U.S. Pat. No. 3,873,671 possesses several inherent limitations. For example, the process is limited in that the reduction of the oxides of nitrogen ($NO_x$) occurs at a temperature below 2000° F. and above 1200° F. At the specified temperature range, heavy hydrocarbon fuels, such as fuel oils heavier than #2 fuel oil, unsaturated hydrocarbons, and long chain length hydrocarbons, will not be oxidized and the decomposition of oxides of nitrogen ($NO_x$) is not favored. Further, if the combustible gases are cooled below 1400° F. the oxidation of the combustibles may not be achieved because the combustible components are greatly diluted by nitrogen, carbon dioxide and water vapor. In addition, if the combustible components are not oxidized, due to the aforementioned dilution, carbon, carbon monoxide and hydrogen will be present in the vent gases. Also, if the gases are recycled to quench the combustion products, a combustible mixture will be introduced into the combustion products, i.e. the effluent from the reduction zone, at a temperature which will allow oxidation to occur. This has resulted in the deflagration of the recycle stream and burning in the recycle stream and vent gases in the stack. Such occurrences would be undesirable, as such are unsafe, since they can damage the equipment and create personnel hazard.

Numerous other processes have heretofore been disclosed for removing oxides of nitrogen ($NO_x$) from waste gas streams so that such gas streams can be safely vented into the atmosphere. For example, some processes have employed catalysts in combination with reducing gases to selectively remove oxides of nitrogen ($NO_x$) from gaseous streams. Other processes have employed ammonia, ammonium formate, ammonium oxalate, ammonium carbonate and the like for selectively reducing the oxides of nitrogen ($NO_x$) in gaseous streams.

While there have been considerable efforts in the art to find effective ways to remove oxides of nitrogen ($NO_x$) from waste gases so that the gases can be discharged into the atmosphere without harm to the environment, new and improved processes are constantly being sought which eliminate the deficiencies of the prior art processes, are safe in operation, and meet the increasingly stringent requirements being placed on the content of oxides of nitrogen ($NO_x$) present in vented gases by federal and state agencies.

SUMMARY OF THE INVENTION

According to the present invention an improved process for reducing the concentration of oxides of nitrogen ($NO_x$) in a chemical effluent is provided. Broadly, the process comprises contacting an effluent stream containing oxides of nitrogen ($NO_x$) with an effective amount of an oxygen containing gas and a stoichiometric excess of a reducing agent to yield a temperature greater than about 2000° F. and provide a combustion effluent substantially free of oxides of nitrogen ($NO_x$); and then contacting the combustion effluent with an effective amount of a gaseous stream containing less than about 21 volume percent oxygen to provide flameless oxidation of the combustibles present in the combustion effluent at a temperature in a range of from about 1600° F. to about 1800° F. to minimize the formation of oxides of nitrogen ($NO_x$).

More specifically, the process of the present invention comprises contacting a chemical waste stream containing oxides of nitrogen ($NO_x$) with an effective amount of an oxygen containing gas to support combustion at a temperature greater than about 2000° F. and less than about 3000° F., and a stoichiometric excess, up to 200% of a hydrocarbon required for the reduction of the available oxygen to provide a combustion effluent; and then contacting the combustion effluent with an effective amount of a gaseous stream containing less than about 21 volume percent oxygen to oxidize the combustibles at a temperature in a range of from about 1600° F. to about 1800° F. The products of this oxidation, i.e. nitrogen, water vapor, carbon dioxide and oxygen, are substantially free of the oxides of nitrogen ($NO_x$) and combustibles and may be cooled in heat exchange equipment to recover energy, recycled to control the combustion of the hydrocarbon and/or the oxidation of the combustibles, or vented to the atmosphere.

An object of the present invention is to provide a process for converting streams containing oxides of nitrogen ($NO_x$) into streams which can be vented safely into the atmosphere without harm to the environment.

Another object of the present invention is to provide an improved process for reducing the content of oxides of nitrogen ($NO_x$) in chemical waste streams which does not suffer from the deficiencies of the prior art processes.

Other objects, advantages and features of the present invention will become apparent to those skilled in the art from a reading of the disclosure and from a consideration of the following description taken in conjunction with the accompanying drawings and appended claims.

BRIEF DESCRIPTION OF THE DRAWING

Drawings accompany and are made a part of the present disclosure. Such drawings and description thereof are merely illustrative of the invention, the precise scope of which is defined in the appended claims. Further, auxiliary equipment, such as valves, flow meters and the like, has been omitted from the drawings for the sake of clarity since such equipment is not required for an understanding of the invention. In the drawings:

FIG. 1 is a schematic flow diagram showing the process of the present invention for reducing the amount of oxides of nitrogen ($NO_x$) in a chemical stream; and FIG. 2 is a schematic flow diagram showing the process of the present invention for reducing the amount of oxides of nitrogen ($NO_x$) in a chemical stream wherein a heat exchanger is employed to recover heat energy.

DESCRIPTION OF PREFERRED EMBODIMENTS

As previously stated, the present invention relates to an improved process for removing oxides of nitrogen ($NO_x$) from chemical waste streams so that the combustion products may be vented into the atmosphere without harm to the environment. Any streams, including both liquid and gaseous streams, containing oxides of nitrogen ($NO_x$) and suitable for combustion, can be treated using the process of the present invention. Illustrative of such streams are the waste streams of a nitroparaffin plant and its offsites, such as the recovered purge gas from the reaction section; the liquid portion and the vapor stream of the overhead product from the acetone removal column; the vent gases from the waste wash system following bisulfite treatment; the waste collection system and the urea reaction tank; the liquid stream consisting of the distillation residues of the final still; the gaseous stream resulting from the iron treatment of the sulfate purge; and the waste stream resulting from nitrogen blanketing of the nitroparaffin tanks.

The composition of each of the aforementioned streams vary substantially. However, each of the streams either contains oxides of nitrogen ($NO_x$) or components which, when subjected to a combustion process, produce oxides of nitrogen ($NO_x$). Further, each of the streams is suitable for injection into a combustion chamber, in the presence of a hydrocarbon, and each of the streams contains components which makes it unacceptable to be vented directly into the atmosphere.

Referring now to the drawings generally, wherein like numerals are used to identify like components, a reduction zone 10 is illustrated comprising a burner 12 and a refractory lined steel shell 14. A chemical stream, such as a gaseous stream containing oxides of nitrogen ($NO_x$) is supplied to the burner 12 via a conduit 16. The gaseous stream 16 may also contain combustible hydrocarbons. To maintain the reduction zone 10 at the desired temperature above about 2000° F., and to insure reduction of the oxides of nitrogen ($NO_x$), air and hydrocarbon are injected into the burner 12 via conduits 18 and 20, respectively.

The hydrocarbon employed as the fuel component can be any suitable hydrocarbon or other reducing agent which can be substantially completely oxidized to carbon dioxide and/or water. For example, the hydrocarbon component injected into the burner 12 of the reduction zone 10 can be paraffinic, olefinic, or aromatic hydrocarbon, including mixtures thereof such as gasoline and fuel oil, oxygenated hydrocarbons including formic and oxalic acids nitrogenated hydrocarbons and the like. Desirably, the hydrocarbon component will be a low molecular weight hydrocarbon, i.e. methane, ethane, and mixtures thereof, such as natural gas.

The amount and rate of hydrocarbon injected into the burner 12 of the reduction zone 10 can vary widely and will depend to a large extent upon the amount of hydrocarbon component present in the chemical waste stream being treated to remove the oxides of nitrogen ($NO_x$). To insure substantially complete reduction of the oxides of nitrogen ($NO_x$) in the reduction zone 10, the hydrocarbon component is injected into the burner 12 in an amount sufficient to provide a stoichiometric excess of the hydrocarbon component, based on the amount of available oxygen, in the reduction zone 10. However, care should be exercised to insure that the amount of hydrocarbon compound does not exceed 200 percent of the stoichiometric requirement to reduce the oxides of nitrogen ($NO_x$) present in the waste stream.

As previously stated, to insure reduction of the oxides of nitrogen ($NO_x$) in the reduction zone 10, the temperature of the reduction zone 10, and thus the effective reaction temperature of the components therein, is maintained at a temperature above 2000° F. In recognition of equipment limitations generally, it is desirable that the temperature of the reduction zone be controlled so as to be less than about 3000° F. Therefore, the effective temperature range at which the reduction zone is maintained is greater than 2000° F. but less than 3000° F. to insure that the oxides of nitrogen ($NO_x$) present in the waste stream react with the hydrocarbon to form such constituents as nitrogen, carbon dioxide, water vapor, hydrogen, carbon monoxide and other combustibles.

To insure that the reduction zone 10 is maintained at a temperature less than 3000° F., cooling fluid may be injected into the refractory lined steel shell 14 of the reduction zone 10 via conduit 22. The cooling fluid, desirably an inert gas such as nitrogen, carbon dioxide, water vapors, or mixtures thereof, can be supplied from an independent source (not shown), or the cooling fluid can be a recycle stream consisting of the resulting gas stream produced by the process of the present invention which is capable of being vented safely into the atmosphere without detrimental effects to the environment.

The reduction product stream, i.e. the combustion effluent from the reduction zone 10, is composed primarily of nitrogen, carbon dioxide, carbon monoxide, hydrogen, and combustibles formed as a result of the dissociation of the excess hydrocarbon present in the reduction zone 10. The combustion effluent is withdrawn from the reduction zone 10 and introduced into an oxidation zone 24 via conduit 26.

The combustion effluent, prior to introduction into the oxidation zone 24, is mixed with an effective amount of an oxygen containing gaseous stream supplied via conduit 28 to provide a stoichiometric excess of oxygen, relative to the amount of combustibles present in the combustion effluent and which, at the same time, provides a reaction temperature in the oxidation zone 24 of about 1600° F. to about 1800° F. By controlling the concentration of oxygen in the oxygen containing stream of conduit 28, and thereby controlling the amount of the oxygen mixed with the combustion effluent in conduit 26, the temperature in the oxidation zone 24 can be controlled within the desired range of about 1600° F. to about 1800° F. and all of the combustibles present in the combustion effluent will be oxidized.

For reasons which will be set forth in more detail hereinafter, the oxygen containing gaseous stream of conduit 28, which is contacted with the oxidation effluent from the reduction zone 10 prior to introducing the effluent into the oxidation zone 24, is a diluted gaseous stream containing less than about 21 volume percent oxygen. The diluted gaseous stream may be an air stream or gas stream containing oxygen which has been diluted with an inert diluent 29 so that the diluted gas which is mixed with the effluent of conduit 26 contains less than 21 volume percent oxygen. Suitable diluents which may be employed to dilute the gaseous stream 28 are nitrogen, carbon dioxide, water vapor, and mixtures thereof.

The diluted gaseous stream 28 containing less than 21 volume percent oxygen allows flameless oxidation of the combustibles present in the combustion effluent to occur in the oxidation zone 24, and precludes high temperatures and high oxygen concentrations in the oxidation zone 24. By precluding high temperatures and high oxygen concentrations in the oxidation zone 24, fixation of nitrogen, i.e. formation of oxides of nitrogen ($NO_x$), is minimized.

The diluted gaseous stream 28 containing less than 21 volume percent oxygen can be supplied from any suitable source (not shown). As an alternative, an effective amount of oxygen can be added to a recycle stream produced by the process as illustrated in FIG. 2, and which will be described in more detail hereinafter, to provide a diluted gaseous stream containing the desired amount of oxygen so that same may be employed as the diluted gaseous stream for mixing with the combustion effluent.

The oxidation zone 24, wherein flameless oxidation of the combustibles present in the combustion effluent occurs, comprises a refractory lined steel shell 30. The oxidation products formed in the oxidation zone 24, which contain less than 1.5 percent oxygen, less than 200 ppm oxides of nitrogen ($NO_x$), and less than 50 ppm unoxidized hydrocarbons, are withdrawn from the refractory lined steel shell 30 via conduit 32 and conveyed to a refractory lined steel vent stack 34 for venting into the atmosphere. The gas stream vented to the atmosphere via a stack 34 is composed of nitrogen, carbon dioxide, water vapor, and oxygen. Further, since the gas stream 32 is substantially free of smoke, combustibles and oxides of nitrogen ($NO_x$), the gas stream 32 is deemed environmentally safe for venting to the atmosphere.

Referring now to FIG. 2, the above described components are shown therein and appropriately numbered; accordingly, a description will only be necessary as to the additional components of this figure. A heat exchanger 40, such as a waste boiler, a superheater, an economizer or combination thereof, is operably connected to the conduit 32 so that oxidation products flowing though conduit 32 are in heat exchange relationship with a coolant in the heat exchanger 40 and the coolant recovers useful energy, e.g. steam. The cooled oxidation products exiting the heat exchanger 40 can thereafter be passed to the vent stack 34 for venting to the atmosphere, or a portion of the oxidation products may be recycled to various stages of the process via a conduit 42.

For example, a portion of the cooled oxidation products, upon exiting the heat exchanger 40, may be passed via conduits 42, 44 to the refractory lined steel shell 14 of the reduction zone 10 and utilized as the cooling fluid to insure that the reduction zone 10 is maintained at a temperature less than 3000° F. A second portion of the cooled oxidation products exiting the heat exchanger 40, may be passed via conduits 42, 28 to the conduit 26 for use as the diluent to oxygen containing stream contacted with the combustion effluent prior to introduction into the combustion zone 24. A third portion of the cooled oxidation products exiting the heat exchanger 40 may be passed via conduits 42, 44 and 46 into the oxidation zone 24 as shown.

In order to more fully describe the improved process of the present invention for removing oxides of nitrogen ($NO_x$) from chemical streams, the following example is given. However, it is to be understood that the example is for illustrative purposes and is not to be construed as limiting the present invention defined in the appended claims. For the sake of clarity, reference will be made to the process embodiment illustrated in FIG. 2 of the drawings in the following example.

EXAMPLE

A vent stream consisting of 100 mols per hour of air and containing 2 mols per hour of oxides of nitrogen ($NO_x$) is injected into the burner 12 of the reduction zone 10 via the conduit 16. Methane is introduced into the burner 12 via the conduit 20 at a rate of 13.75 mols per hour to provide a stoichiometric excess of hydrocarbon relative to the available oxygen (both free and bound as oxides of nitrogen $NO_x$) of 25 percent. The temperature in the refractory lined steel shell 14 of the reduction zone 10 is controlled to 2600° F. by injecting 44.71 mols per hour of the the flue gas at 400° F. into the refractory lined steel shell 14. The flue gas, which serves as a cooling fluid, is injected into the refractory lined steel shell 14 via the conduits 42, 44.

The reduction product stream, i.e. the combustion effluent, is removed from the refractory lined steel shell 14 via the conduit 26, and such stream contains a mixture of carbon dioxide, water vapor, nitrogen, carbon monoxide, and hydrogen. The reduction product stream 26, which has a temperature of 2600° F., is mixed with an air stream 28 diluted with a recycle stream 42A consisting of oxidation effluent recovered from the oxidation zone 24 to produce an oxygen containing stream 28A having 10 percent by volume oxygen. The flow rate of the air stream 28 is 37.11 mols per hour and the flow rate of the inert diluent recycle stream 42A is 40.79 mols per hour. The concentration of oxygen is sufficient to oxidize the combustibles in the reduction product stream 26 and yield 1.5 percent oxygen in the oxidation effluent recovered from the oxidation zone 24.

The temperature in the oxidation zone 24 is controlled at 1800° F. by injecting 130.63 mols per hour of the cooled recycle stream 44 into the oxidation zone 24 via the conduit 46. The oxidation effluent withdrawn from the oxidation zone 24 passes via the conduit 32 through the heat exchanger 40 which cools the oxidation effluent to 400° F. The oxidation effluent 32, less the portion recycled as diluent and cooling fluid through the conduit 42, flows via the conduit 32A to the vent stack 34 where it is vented to the atmosphere at a flow rate of 152.86 mols per hour. This oxidation effluent consists primarily of carbon dioxide, water vapor, nitrogen and oxygen. The flowrate of the portion of the cooled oxidation effluent 42 which is used for cooling fluid and diluent, as set forth above, is 216.13 mols per hour.

The composition, flowrate and temperature of the various streams, at selected locations in the process described above, are tabulated as follows with reference to FIG. 2:

| | Conduit 16 $NO_x$ Containing Gas | Conduit 20 Hydrocarbon | PROCESS CONDITIONS Conduit 44 Cooling Fluid to Reduction Zone | Conduit 26 Reduction Effluent Stream | Conduit 42A Diluent Oxygen Containing Gas | Conduit 28 Oxygen Containing Stream | Conduit 28A Cooling Fluid to Oxidation Zone | Conduit 32 Oxidation Effluent |
|---|---|---|---|---|---|---|---|---|
| Flow Rate (Mol/Hr) | 102.00 | 13.75 | 44.71 | 171.01 | 40.79 | 77.9 | 130.63 | 152.86 |
| Temperature (F.) | 80 | 80 | 400 | 2600 | 400 | 240 | 400 | 400 |
| Composition (Mol %) | | | | | | | | |
| $N_2$ | 77.45 | — | 71.50 | 65.60 | 71.50 | 75.08 | 71.50 | 71.50 |
| $O_2$ | 20.59 | — | 1.50 | — | 1.50 | 10.78 | 1.50 | 1.50 |
| $NO_x$ | 1.96 | — | less than 150 ppm | — | less than 150 ppm | — | less than 150 ppm | less than 150 ppm |
| $CH_4$ | — | 100.00 | — | — | — | — | — | — |
| $CO_2$ | — | — | 9.00 | 10.39 | 9.00 | 4.71 | 9.00 | 9.00 |
| $H_2O$ | — | — | 18.00 | 17.57 | 18.00 | 9.42 | 18.00 | 18.00 |
| CO | — | — | — | 3.22 | — | — | — | — |
| $H_2$ | — | — | — | 3.22 | — | — | — | — |

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A process for reducing the concentration of oxides of nitrogen in a stream comprising:
    burning the stream containing oxides of nitrogen at a temperature greater than about 2000° F. in the presence of a stoichiometric excess of an amount of a reducing agent required for stoichiometric reduction of available oxygen to provide a combustion effluent substantially free of oxides of nitrogen; and
    reacting the combustion effluent with a gaseous stream having an effective amount of oxygen to achieve flameless oxidation of the combustibles present in the combustion effluent at a temperature of about 1600° F. to about 1800° F. to produce an oxidation effluent substantially free of oxides of nitrogen.

2. The process of claim 1 wherein the oxygen containing gaseous stream is a diluted gaseous stream containing less than about 21 volume percent oxygen.

3. The process of claim 2 wherein the effective amount of the oxygen in the gaseous stream is a stoichiometric excess, based on the amount of the combustibles present in the combustion effluent.

4. The process of claim 1 or 3 which further comprises cooling the oxidation effluent in a heat exchanger to recover heat energy.

5. The process of claim 4 which further comprises recycling a portion of the cooled oxidation effluent as an inert carrier gas for the dilution of the oxygen containing gaseous stream employed to achieve flameless oxidation of the combustibles present in the combustion effluent.

6. The process of claim 4 which further comprises recycling a portion of the cooled oxidation effluent as a coolant gas for maintaining the temperature of the waste stream at a temperature greater than about 2000° F. and less than about 3000° F. during the burning of the waste stream.

7. The process of claim 4 which further comprises recycling a portion of the cooled oxidation effluent as a coolant gas to the oxidation zone to maintain the temperature of the combustion effluent at the temperature of from about 1600° F. to about 1800° F. during oxidation of the combustion effluent.

8. The process of claim 1 wherein the burning of the waste stream is carried out at a temperature greater than 2000° F. and less than 3000° F.

9. The process of claim 8 which further comprises venting at least a portion of the oxidation effluent to the atmosphere.

10. The process of claim 1 wherein the reducing agent is a hydrocarbon, the amount of the hydrocarbon added during the burning of the waste stream being less than about 200 percent of the stoichiometric amount required for the stoichiometric reduction of available oxygen present during the burning of the waste stream.

11. The process of claim 10 wherein the hydrocarbon is a low molecular weight hydrocarbon.

12. The process of claim 11 wherein the low molecular weight hydrocarbon is selected from the group consisting of methane, ethane, and natural gas.

13. A process for reducing the concentration of oxides of nitrogen in a chemical waste stream comprising:
    burning the waste stream containing oxides of nitrogen with effective amounts of air and a reducing agent at a temperature in the range of greater than about 2000° F. and less than about 3000° F. to provide a combustion effluent substantially free of the oxides of nitrogen, the reducing agent being present in an amount to provide a stoichiometric excess, based on the amount of available oxygen, but less than 200 percent of such stoichiometric amount; and
    contacting the combustion effluent with an effective amount of an oxygen containing gaseous stream to achieve flameless oxidation of combustibles present in the combustion effluent at a temperature in the range of from about 1600° F. to about 1800° F. so as to minimize formation of oxides of nitrogen and produce an oxidation effluent, the oxygen containing gaseous stream having a stoichiometric excess of oxygen based on the amount of combustibles present in the effluent and less than 21 volume percent oxygen.

14. The process of claim 13 which further comprises cooling the oxidation effluent in a heat exchanger to recover heat energy.

15. The process of claim 14 which further comprises recycling a portion of the cooled oxidation effluent as an inert carrier gas for dilution of the oxygen containing gaseous stream.

16. The process of claim 14 or 15 which further comprises recycling a portion of the cooled oxidation effluent as a coolant gas for maintaining the burning temperature of the waste stream at a temperature greater than about 2000° F. and less than about 3000° F.

17. The process of claim 14 which further comprises recycling a portion of the cooled oxidation effluent as coolant gas to maintain the temperature of the combustion effluent stream at the temperature of from about 1600° F. to about 1800° F. during oxidation of the combustion effluent.

18. The process of claim 13 which further comprises venting the oxidation effluent to the atmosphere.

19. The process of claim 13 wherein the reducing agent is a low molecular weight hydrocarbon.

20. The process of claim 19 wherein the low molecular weight hydrocarbon is selected from the group consisting of methane, ethane, and natural gas.

* * * * *